United States Patent
Brun et al.

(10) Patent No.: US 11,794,265 B2
(45) Date of Patent: Oct. 24, 2023

(54) METHOD FOR PROVIDING A WELDED JOINT BETWEEN DISSIMILAR MATERIALS

(71) Applicant: C.R.F. Società Consortile per Azioni, Orbassano (IT)

(72) Inventors: Rosanna Brun, Orbassano (IT); Adriano Lateana, Orbassano (IT); Piergiorgio Romanin, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 692 days.

(21) Appl. No.: 16/778,189

(22) Filed: Jan. 31, 2020

(65) Prior Publication Data
US 2020/0246896 A1 Aug. 6, 2020

(30) Foreign Application Priority Data
Feb. 6, 2019 (EP) .................. 19155751

(51) Int. Cl.
*B23K 1/00* (2006.01)
*B23K 1/005* (2006.01)
(Continued)

(52) U.S. Cl.
CPC .......... *B23K 1/0056* (2013.01); *B23K 1/0006* (2013.01); *B23K 26/0093* (2013.01);
(Continued)

(58) Field of Classification Search
CPC .............. B23K 2103/20; B23K 26/323; B23K 2101/006; B23K 26/211; B23K 35/0266;
(Continued)

(56) References Cited

U.S. PATENT DOCUMENTS

2007/0221631 A1* 9/2007 Ruokolainen .......... B23K 9/173
219/121.11
2012/0074111 A1 3/2012 Sasabe et al.
(Continued)

FOREIGN PATENT DOCUMENTS

DE 102014217890 A1 3/2016
DE 102016006035 A1 12/2016
(Continued)

OTHER PUBLICATIONS

European Search Report dated Sep. 23, 2019. 7 pages.

*Primary Examiner* — Erin B Saad
(74) *Attorney, Agent, or Firm* — RMCK Law Group PLC

(57) ABSTRACT

A method for providing a welded joint includes: providing a first metal sheet having a first melting point; providing a second metal sheet having a second melting point, the second melting point being lower than the first melting point; providing a weld material; and joining the first metal sheet and the second metal sheet together by means of the weld material, thus defining a first joining interface between the first metal sheet and the weld material and a second joining interface between the second metal sheet and the weld material. The joining includes heating the second metal sheet at the second joining interface to a temperature higher than the second melting point, but lower than the first melting point.

15 Claims, 2 Drawing Sheets

(51) Int. Cl.
*B23K 26/00* (2014.01)
*B23K 35/28* (2006.01)
*B23K 103/20* (2006.01)
*B23K 1/19* (2006.01)

(52) U.S. Cl.
CPC .............. *B23K 35/282* (2013.01); *B23K 1/19* (2013.01); *B23K 2103/20* (2018.08)

(58) Field of Classification Search
CPC .............. B23K 35/286; B23K 35/3605; B23K 35/368; B23K 9/173; B23K 1/0056; B23K 1/19; B23K 2101/185; B23K 2103/04; B23K 2103/05; B23K 2103/10; B23K 26/123; B23K 26/14; B23K 26/242; B23K 26/32; B23K 35/0255; B23K 35/362; B23K 2101/18; B23K 26/0622; B23K 26/082; B23K 26/206; B23K 26/21; B23K 26/244; B23K 26/26; B23K 35/36; B23K 9/232
See application file for complete search history.

(56) References Cited

U.S. PATENT DOCUMENTS

2013/0273390 A1\* 10/2013 Wakisaka ........... B23K 35/3053
428/653
2016/0297020 A1  10/2016  Kaitoku et al.

FOREIGN PATENT DOCUMENTS

EP    1749616 A1   2/2007
WO    0243913 A1   6/2002

\* cited by examiner

METHOD FOR PROVIDING A WELDED JOINT BETWEEN DISSIMILAR MATERIALS

CROSS-REFERENCE TO RELATED APPLICATION

This application claims priority to European Patent Application No. 19155751.1 filed Feb. 6, 2019. The disclosure of the above application is incorporated herein by reference in its entirety.

FIELD OF THE INVENTION

The present invention relates to welding processes, in particular to processes for weld materials that are dissimilar.

PRIOR ART AND GENERAL TECHNICAL PROBLEM

The provision of welded joints of the so-called hybrid type is today increasingly frequent in the industrial sector, in particular in the automotive industry, as a result of the increasingly widespread use of sheets of material different from steel for producing parts of the bodywork or frame of the motor vehicle. One of the hybrid joints most commonly encountered in the automotive industry is the one between sheets comprising an iron alloy, typically steel for frames and bodies of motor vehicles, and sheets comprising an aluminium alloy.

The metallurgy of welded joints that involve iron and aluminium alloys is extremely complex, and any assembly by fusion between such materials (hence including welding) requires the use of dedicated technologies and procedures on account of the marked differences of behaviour that these materials exhibit when they are subjected to heating. Among the most well-known differences are the following:
- the different coefficient of linear thermal expansion between the two metals;
- the different melting points of the two metals; and
- the different thermal conductivity between the two metals.

This means that localised heating of sheets of steel and aluminium that are joined by welding gives rise to an asymmetric distribution of energy and to markedly irregular thermal profiles.

Not least important, during cooling the different thermal properties of the two materials give rise to deformations on account of the state of stress that remains in the material at the joining interface.

Moreover, during the process of welding of an iron-alloy material to an aluminium-alloy material there is often noted the formation of inter-metal compounds, which constitute an independent phase in the material that is highly liable to embrittle the welded joint.

OBJECT OF THE INVENTION

The object of the present invention is to overcome the technical problems mentioned previously.

In particular, the object of the invention is to provide a hybrid welded joint that is characterised by high mechanical properties and that is substantially free from problems of embrittlement due to the formation of inter-metal phases.

SUMMARY OF THE INVENTION

The object of the present invention is achieved by a method having the characteristics forming the subject of the ensuing claims, which constitute an integral part of the technical teaching provided herein in relation to the invention.

BRIEF DESCRIPTION OF DRAWINGS

The invention will now be described with reference to the annexed plates of drawings, which are provided purely by way of non-limiting example and in which.

DETAILED DESCRIPTION

Figure 1:
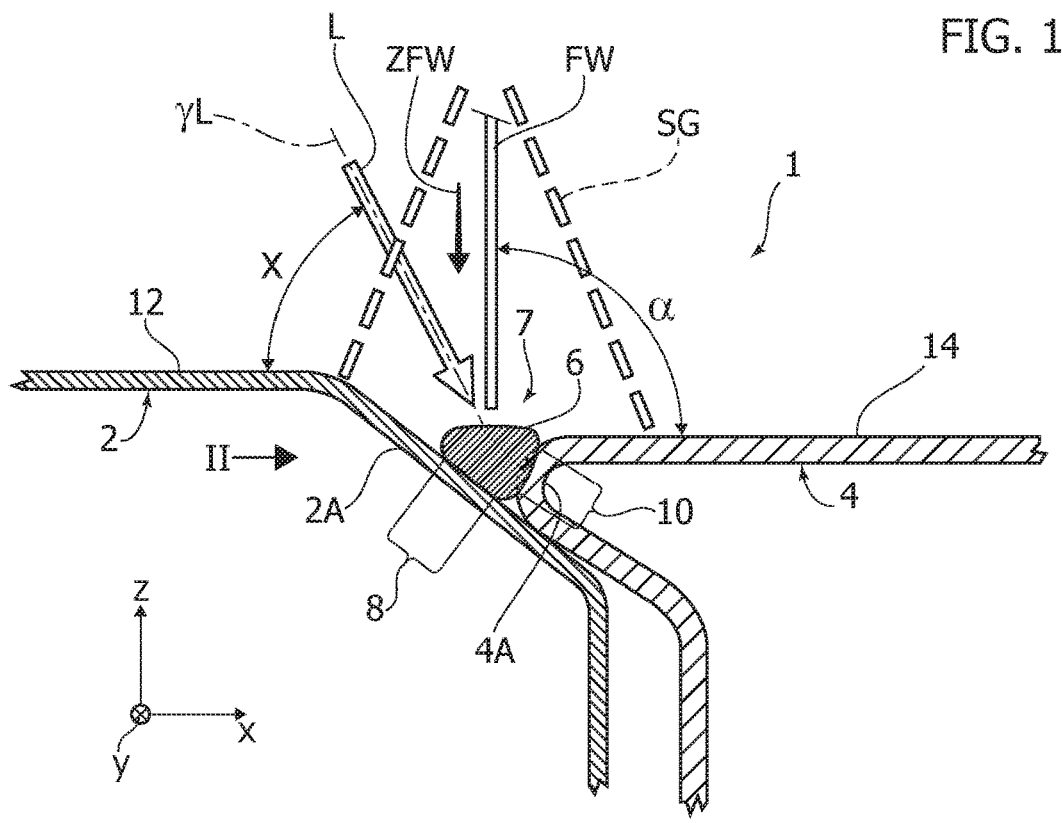
FIG. 1 is a schematic view of a welded joint obtained according to the method of the invention.
Figure 2:
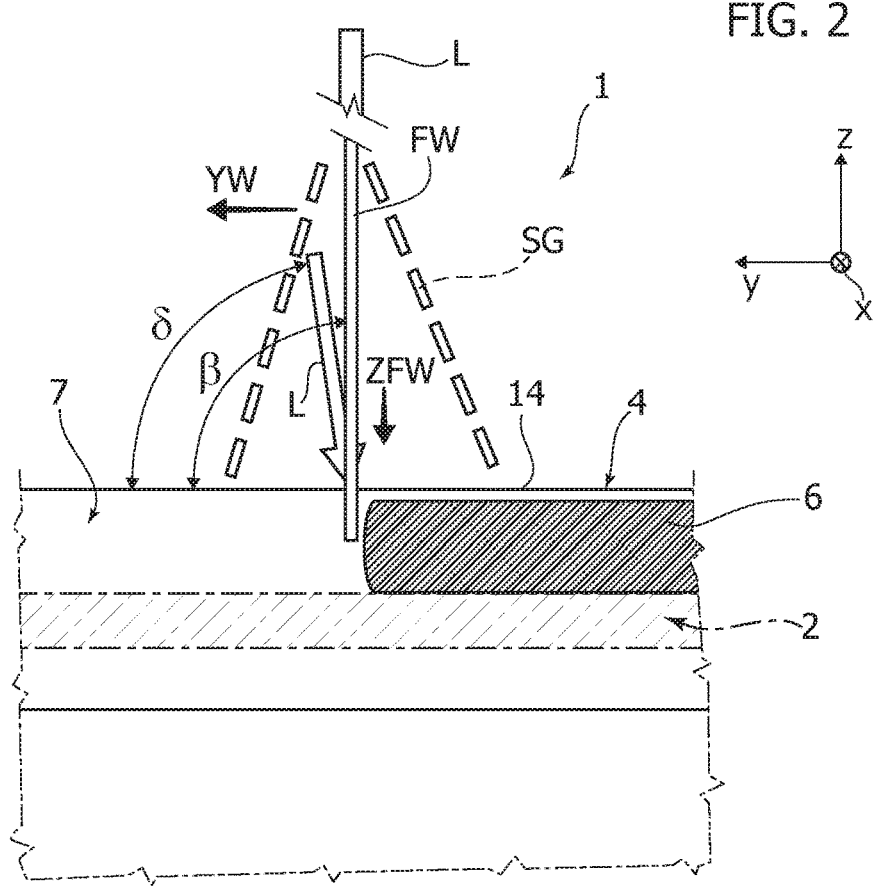
FIG. 2 is an orthogonal view according to the arrow II of FIG. 1.

Reference number 1 in FIG. 1 designates as a whole a welded joint obtained using a method according to the invention. Each of FIGS. 1 and 2 represents a cartesian reference system X-Y-Z that identifies three reference directions. Any co-ordinate present that refers to a given component of the joint 1 is designated by a composite reference, the prefix of which identifies the axis along which the co-ordinate develops.

The welded joint 1 comprises a first metal sheet 2 and a second metal sheet 4, which are joined by means of a weld bead 6 generated by melting a weld material FW supplied in the form of wire in a direction of supply ZFW.

When the sheets 2 and 4 are set up against one another to form the welded joint 1, they define a groove 7, within which the weld material FW is molten so as to form the weld bead 6. The groove 7 has a direction of development oriented parallel to the axis Y, and in this joint provided by way of example it is obtained by setting up against one another a flat member 2A of the metal sheet 2 and a bent-back portion 4A of the metal sheet 4, where the bent-back portion 4A in turn defines a substantially U-shaped groove.

The welded joint 1 comprises a first joining interface 8 between the first metal sheet 2 and the weld material of the bead 6, and a second joining interface 10 between the second metal sheet 4 and the weld material of the bead 6, where both of the interfaces 8, 10 face the inside of the groove 7.

According to the invention, the first metal sheet 2 is a metal sheet comprising an iron alloy, for example a steel sheet. Preferably, the method according to the invention is implemented by providing a first metal sheet 2 made of galvanised steel, in particular zinc-plated steel.

The first metal sheet 2 has a first melting point, which in the preferred embodiment is generally comprised between 1400° C. and 1600° C. The second metal sheet 4 is a metal sheet comprising an aluminium alloy, and consequently has a second melting point lower than the first melting point and generally in the range between 550° C. and 660° C.

The melting points may in any case vary—even going slightly beyond the aforementioned ranges—according to the specific composition of the alloys of which the sheets 2, 4 are made.

The method according to the invention hence comprises providing the sheets 2 and 4 and joining them using the molten weld material FW to form the bead 6. According to the invention, joining of the first and second sheets 2, 4 using the weld material FW comprises heating the second metal sheet 4 at the second joining interface 10 to a temperature higher than the second melting point, but lower than the first melting point. In this way, in addition to causing melting of the weld material FW to form the bead 6 in the groove 7, the aforesaid heating causes a localised melting of the sheet 4 at the second joining interface 10. Consequently, the connection between the weld material FW (bead 6) and the sheet 4 is obtained by fusion, whereas at the first joining interface 8 only a localised heating of the sheet 2 may be noted without melting thereof so that joining thereof with the weld material of the weld bead 6 is obtained by brazing.

Advantageously, if the first metal sheet 2 is made of zinc-plated steel, it is preferable to use a weld material FW comprising a zinc alloy, provided that this alloy has a content of zinc of at least 60 wt %. In the preferred embodiment, for reasons that will be illustrated in the ensuing description and that are linked to the increase in the strength of the joint 1, the weld material FW is a Zn—Al alloy with a content of zinc of at least 60 wt %. In a further embodiment, the weld material FW is a Cu—Zn alloy with a content of copper of at least 30 wt %.

The method according to the invention then envisages obtaining melting of the low-melting sheet (sheet 4) without arriving at melting of the high-melting sheet (sheet 2) so as to prevent formation of any inter-metal compound comprising the basic materials of the two sheets.

When the first metal sheet 2 is a zinc-plated steel, use of a weld material FW comprising a Zn—Al alloy with a content of zinc of at least 60 wt % obtains a particularly strong joint in so far as the fraction of aluminium of the weld material FW fuses with the aluminium of the sheet 4, whereas the fraction of zinc of the weld material FW achieves a brazed joint with the layer of zinc that coats the sheet 2.

In a preferred embodiment of the method according to the invention, heating of the sheet 4 (and of the weld material FW) at the second joining interface is obtained by means of a laser beam L (FIGS. 1-3) with axis $\gamma L$ concentrated in the area 10.

Once again preferably, in combination with heating using the laser beam L, welding of the sheets 2, 4 to form the joint 1 is carried out by providing a shield-gas curtain SG around the area where heating takes place (the laser beam L and the shield-gas curtain SG are mobile in the welding direction YW together with the welding head, FIG. 2).

Figure 3:
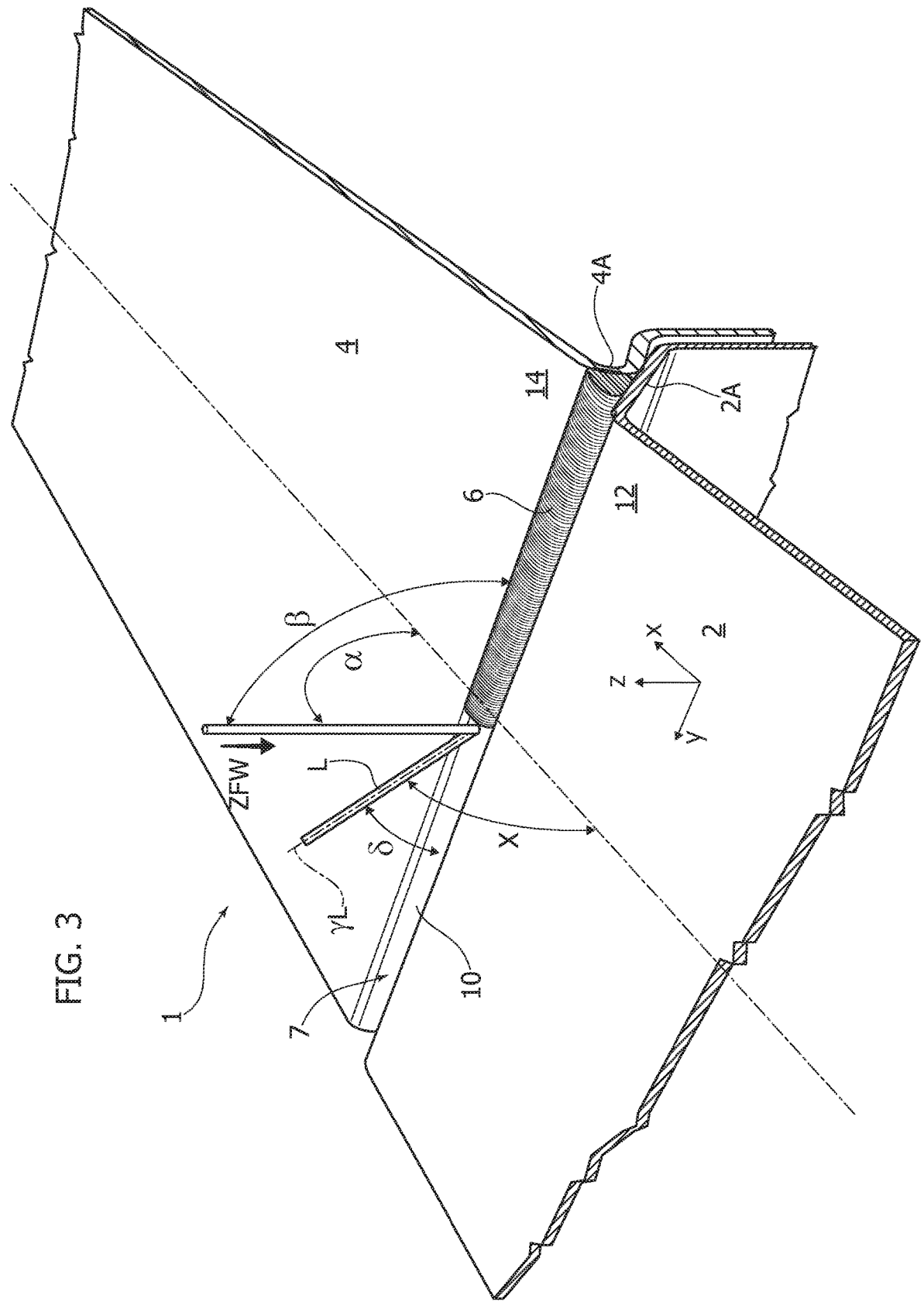
FIG. 3 is a perspective view of the welded joint of FIG. 1.

There may moreover be defined, according to the invention, some characteristic process angles that will now be described with the aid of FIGS. 1, 2, and 3.

The joint exemplified in FIG. 1 comprises, preferably adjacent to the groove 7, at least one planar surface. In the reference system adopted in the figures, the planar surface is parallel to the plane XY. The planar surface is provided by one or other of the sheets 2, 4, and in the embodiment illustrated here it is provided by both of them, for a total of two planar surfaces adjacent to the groove 7. In particular, adjacent to the flat member 2A, the sheet 2 comprises a planar surface 12, which forms an angle with the flat member 2A, whereas the sheet 4 comprises a planar surface 14, which terminates where the bent-back portion 4A starts. The surfaces 12, 14 are parallel to one another and to the plane XY.

The laser beam L impinges upon the joining interface 10 with a first angle $\chi$ comprised between 0° and 90°, preferably between 5° and 75°. The angle $\chi$ is measured in the plane XZ (which is orthogonal to the direction of development of the groove 7, as well as being the direction of movement of the welding head) and corresponds to an angle of inclination of the laser beam L with respect to the planar surface 12.

A second angle $\alpha$ is moreover defined between the direction of supply ZFW of the weld material FW, here parallel to the axis Z, and the planar surface 14 or 12, and is comprised between 0° and 90°. As in the case of the angle $\chi$, also the angle $\alpha$ is measured in the plane XZ (which is orthogonal to the direction of development of the groove 7, as well as being the direction of movement of the welding head) and corresponds to an angle of inclination of the laser beam L with respect to the planar surface 12. In the preferred embodiment, the angle $\alpha$ is equal to the angle $\chi$; i.e., the weld material FW is supplied in a direction parallel to the laser beam L.

With reference to FIG. 2, a third angle $\beta$ is moreover defined measured between the direction of supply ZFW of the weld material FW and the direction of development (Y) of the groove 7, where the angle $\beta$ is measured in a plane YZ parallel to the direction of development of the groove 7 and is comprised between 0° and 90°, preferably between 25° and 90°. Unlike the angles $\chi$ and $\alpha$, the angle $\beta$ is measured in the plane YZ and corresponds to an angle of inclination of the direction of supply ZFW with respect to the planar surface 14 (or 12). The perspective view of FIG. 3 illustrates the development of the three angles $\alpha$, $\beta$, $\gamma$ in space with respect to the joint 1.

Provided that the values of the angles listed above are not modified, the weld bead 6 may be obtained in a continuous way, i.e., as a bead of molten weld material FW to form the weld bead 6 without any discontinuity (this involving the presence of joining interfaces 8, 10, which are also continuous in the direction of development Y of the groove 7), or else in a discontinuous way, i.e., with multiple stretches of molten weld material FW to form the weld bead 6 alternating with stretches where the joint is absent (in this case also the interfaces 8, 10 are discontinuous).

A joint obtained by the welding method described above exhibits exceptional static mechanical properties and fatigue mechanical properties, and is likewise immune from phenomena of embrittlement thanks to the absence, or minimal presence, of inter-metal compounds at the interface between the two sheets, however dissimilar the materials constituting the latter may be.

As has been mentioned, melting of only one of the two materials, in particular only the low-melting material, radically eliminates the source of formation of the inter-metal phase, and hence renders the joint particularly immune from formation of impurities. For this reason, it is possible to implement the method both by providing the shield-gas curtain SG (FIG. 1) and in the absence thereof.

Of course, the details of construction and the embodiments may vary widely with respect to what has been described and illustrated herein, without thereby departing from the scope of the present invention as defined by the annexed claims.

The invention claimed is:

1. A method for providing a welded joint, comprising:
   providing a first metal sheet having a first melting point;
   providing a second metal sheet having a second melting point, said second melting point being lower than said first melting point;
   providing a weld material; and
   joining the first metal sheet and the second metal sheet by means of the weld material, thus defining a first joining interface between said first metal sheet and said weld material and a second joining interface between said second metal sheet and said weld material,
   wherein said joining includes heating said second metal sheet at said second joining interface to a temperature higher than the second melting point, but lower than the first melting point such that i) the first metal sheet is not melted during the joining, and ii) there is not an intermetallic compound formed at the first joining interface.

2. The method according to claim 1, wherein the first metal sheet comprises an iron alloy, and the second metal sheet comprises an aluminium alloy.

3. The method according to claim 1, wherein the weld material comprises a zinc alloy with a content of zinc of at least 60 wt %.

4. The method according to claim 3, wherein said first metal sheet is a sheet of galvanised steel.

5. The method according to claim 1, wherein said heating is carried out using a laser.

6. The method according to claim 5, wherein said heating is carried out with a shield-gas curtain.

7. The method according to claim 1, wherein the first metal sheet and the second metal sheet define between them a groove when they are set up against one other to define the welded joint, said first joining interface and said second joining interface facing said groove.

8. The method according to claim 7, wherein at least one of said first metal sheet and said second metal sheet, includes a planar surface adjacent to said groove.

9. The method according to claim 8, wherein a first angle comprised between said at least one planar surface and an axis of a laser beam focused on said second joining interface is comprised between 0° and 90°, said first angle being measured in a plane (XZ) orthogonal to a longitudinal direction of said groove.

10. The method according to claim 9, wherein a second angle comprised between a direction of supply of said weld material and said at least one planar surface is equal to said first angle, said second angle being measured in the plane (XZ) orthogonal to the longitudinal direction of said groove.

11. The method according to claim 10, wherein a third angle comprised between the direction of supply of said weld material and said at least one planar surface is comprised between 0° and 90°, said third angle being measured in a plane (YZ) parallel to the longitudinal direction of said groove.

12. The method according to claim 1, wherein said heating comprises fusing said weld material via welding to said second metal sheet at said second joining interface, and brazing said weld material to said first metal sheet at said first joining interface, where said weld material forms a weld bead.

13. The method according to claim 3, wherein said weld material is a Zn—Al alloy.

14. The method according to claim 1, wherein said first joining interface and said second joining interface are continuous.

15. The method according to claim 1, wherein said first joining interface and said second joining interface are discontinuous.

* * * * *